(12) United States Patent
Tornhill

(10) Patent No.: US 10,802,823 B2
(45) Date of Patent: Oct. 13, 2020

(54) METHOD FOR IDENTIFYING CRITICAL PARTS IN SOFTWARE CODE

(71) Applicant: Empear AB, Malmö (SE)

(72) Inventor: Adam Tornhill, Malmö (SE)

(73) Assignee: EMPEAR AB, Malmo (SE)

( * ) Notice: Subject to any disclaimer, the term of this patent is extended or adjusted under 35 U.S.C. 154(b) by 0 days.

(21) Appl. No.: 16/317,585

(22) PCT Filed: Jul. 10, 2017

(86) PCT No.: PCT/SE2017/050770
§ 371 (c)(1),
(2) Date: Jan. 14, 2019

(87) PCT Pub. No.: WO2018/030940
PCT Pub. Date: Feb. 15, 2018

(65) Prior Publication Data
US 2019/0294432 A1 Sep. 26, 2019

(30) Foreign Application Priority Data

Aug. 11, 2016 (EP) .................................... 16183741

(51) Int. Cl.
*G06F 9/44* (2018.01)
*G06F 11/36* (2006.01)
(Continued)

(52) U.S. Cl.
CPC .................. *G06F 8/71* (2013.01); *G06F 8/72* (2013.01); *G06F 11/3616* (2013.01);
(Continued)

(58) Field of Classification Search
CPC ..... G06F 8/41; G06F 8/51; G06F 8/65; G06F 8/71; G06F 8/33; G06F 8/75; G06F 8/751;
(Continued)

(56) References Cited

U.S. PATENT DOCUMENTS 6,263,348 B1    7/2001  Kathrow
6,654,954 B1 *  11/2003 Hicks .................. G06F 9/45516
                                                           707/999.202

(Continued)

OTHER PUBLICATIONS

Catarina Costa et al., TIPMerge: Recommending Developers for Merging Branches, Nov. 13-18, 2016, [Retrieved on Aug. 4, 2020]. Retrieved from the internet: <URL: https://dl.acm.org/doi/pdf/10.1145/2950290.2983936> 5 Pages (998-1002) (Year: 2016).*

(Continued)

*Primary Examiner* — Anibal Rivera
(74) *Attorney, Agent, or Firm* — Tucker Ellis LLP

(57) ABSTRACT

A method for identifying critical parts in software code comprised in a number of software code files. The method comprises fetching at least two revisions of the software code, wherein the at least two revisions includes a first revision and a second revision, and the second revision being a latter revision. The method further comprises comparing the second revision to the first revision in order to identify at least a first and a second segment of software code in the second revision that have been changed, fetching at least a first and second timestamp correlated with the change of the at least first and second segment of software code respectively, and determining a time difference between the change of the at least first and second segment of software code based on the at least first and second timestamp. If the time difference is within a predetermined range, the method includes assigning a temporal coupling between the at least first and second segment of software code. If the temporal coupling has been assigned, the method also includes identifying the first and/or second segment of software code as critical parts.

10 Claims, 4 Drawing Sheets

(51) Int. Cl.
*G06Q 10/06* (2012.01)
*G06F 8/71* (2018.01)
*G06F 8/72* (2018.01)
*G06F 21/57* (2013.01)
*G06F 8/41* (2018.01)
*G06F 8/75* (2018.01)
*G06F 8/65* (2018.01)
*G06F 8/33* (2018.01)

(52) U.S. Cl.
CPC ....... *G06F 21/577* (2013.01); *G06Q 10/0635* (2013.01); *G06F 8/33* (2013.01); *G06F 8/447* (2013.01); *G06F 8/65* (2013.01); *G06F 8/75* (2013.01); *G06F 11/3676* (2013.01); *G06F 2221/033* (2013.01)

(58) Field of Classification Search
CPC .......... G06F 8/72; G06F 8/70; G06F 9/45516; G06F 9/506; G06F 11/3676; G06F 11/36; G06F 11/3616; G06F 8/447; G06F 8/77; G06F 8/36; G06F 21/577; G06F 2221/033; G06Q 10/0635; G06Q 10/06; G06Q 10/063112
See application file for complete search history.

(56) References Cited

U.S. PATENT DOCUMENTS

| | | | |
|---|---|---|---|
| 7,395,529 B1* | 7/2008 | Stanton | G06F 8/71 717/131 |
| 8,417,996 B2* | 4/2013 | Anand | G06Q 10/06 714/26 |
| 8,769,501 B2* | 7/2014 | Salecker | G06F 8/75 717/126 |
| 8,990,773 B2* | 3/2015 | Amano | G06F 8/71 717/122 |
| 9,176,729 B2* | 11/2015 | Mockus | G06F 8/70 |
| 9,378,015 B2* | 6/2016 | Nagappan | G06F 11/3616 |
| 9,542,176 B2* | 1/2017 | Bird | G06F 8/71 |
| 9,665,471 B1* | 5/2017 | Bienkowski | G06F 11/3664 |
| 9,692,757 B1* | 6/2017 | Mikulski | H04L 9/3242 |
| 10,289,532 B2* | 5/2019 | Jain | G06F 11/3676 |
| 2008/0172660 A1* | 7/2008 | Arning | G06F 8/33 717/144 |
| 2009/0019426 A1* | 1/2009 | Baeumer | G06F 8/71 717/122 |
| 2011/0041120 A1* | 2/2011 | Nagappan | G06F 8/77 717/126 |
| 2011/0258478 A1* | 10/2011 | Anand | G06Q 10/06 714/1 |
| 2012/0159434 A1* | 6/2012 | Dang | G06F 8/36 717/120 |
| 2013/0080997 A1* | 3/2013 | Dattathreya | G06F 8/71 717/121 |
| 2013/0152046 A1* | 6/2013 | Salecker | G06F 8/71 717/122 |
| 2013/0167120 A1* | 6/2013 | Amano | G06F 8/71 717/122 |
| 2013/0167129 A1 | 6/2013 | Emani et al. | |
| 2014/0165027 A1* | 6/2014 | Herbert | G06Q 10/063112 717/101 |
| 2015/0067861 A1* | 3/2015 | Foley | G06F 21/57 726/24 |
| 2015/0100940 A1* | 4/2015 | Mockus | G06F 8/70 717/101 |
| 2016/0026452 A1* | 1/2016 | Dani | G06F 8/65 717/170 |
| 2016/0034273 A1* | 2/2016 | Leupold | G06F 8/71 717/122 |
| 2016/0299835 A1* | 10/2016 | Jain | G06F 11/3676 |
| 2017/0091078 A1* | 3/2017 | Atyam | G06F 11/3672 |
| 2018/0024911 A1* | 1/2018 | Kruszewski | G06F 11/3664 717/125 |
| 2018/0275970 A1* | 9/2018 | Woulfe | G06F 8/70 |
| 2018/0276584 A1* | 9/2018 | Woulfe | G06Q 10/06398 |

OTHER PUBLICATIONS

Emerson Murphy-Hill et al., Improving Software Developers' Fluency by Recommending Development Environment Commands, Nov. 11-16, 2012, [Retrieved on Aug. 4, 2020]. Retrieved from the internet: <URL: https://dl.acm.org/doi/pdf/10.1145/2393596.2393645> 11 Pages (1-11) (Year: 2012).*

International Search Report and Written Opinion from corresponding International Patent Application No. PCT/SE2017/050770, dated Oct. 11, 2017.

Extended European Search Report from corresponding European Patent Application No. 16183741.4, dated Dec. 5, 2016.

Anshu Parashar et al., "Measuring Change-Readiness of Classes by Mining Change-History", Software Engineering Notes, vol. 39, No. 6, Dec. 9, 2014.

Omar Alam et al., "Measuring the Progress of Projects using Time Dependence of Code Changes", Software Maintenance, pp. 329-338, Sep. 20, 2009.

Fehmi Jaafar et al., "Detecting Asynchrony and Dephase Change Patterns by Mining Software Repositories", Journal of Software: Evolution and Process, vol. 26, No. 1, Oct. 14, 2013.

* cited by examiner

METHOD FOR IDENTIFYING CRITICAL PARTS IN SOFTWARE CODE

CROSS-REFERENCE TO RELATED APPLICATIONS

This applications is national phase application of International Application No. PCT/SE2017/050770 field Jul. 10, 2017. Application No. PCT/SE2017/050770 claims priority to European Patent Application No. 16183741.4 filed Aug. 11, 2016. The entireties of the aforementioned applications are incorporated herein by reference.

TECHNICAL FIELD

The inventive concept generally relates to the field of software programming, and more particularly to the field of software code management and risk assessment of software code.

BACKGROUND

Companies in the software industry spend a large part of their budget on maintaining and improving existing software code. Large software code files are usually the product of a shared development effort. It is not an unusual occurrence to find 30-40 developers having made contributions to a single software code file. Further, such large software code files could consist of thousands of lines of code, and may in some cases be seen as a system by themselves. As a result, software code is often difficult to maintain, and no single developer has a holistic picture of the evolution of the software code.

There is therefore a need for improved software code management, facilitating software maintenance and software code comprehension.

SUMMARY OF THE INVENTION

It is an object of the present inventive concept to mitigate, alleviate or eliminate one or more of the above-identified deficiencies in the art and disadvantages singly or in combination.

According to a first aspect of the inventive concept, these and other objects are achieved in full, or at least in part, by a method for identifying critical parts in software code comprised in a number of software code files, the method comprising: fetching at least two revisions of the software code, wherein the at least two revisions comprises a first revision and a second revision, the second revision being a latter revision; comparing said second revision to said first revision in order to identify at least a first and a second segment of software code in said second revision that have been changed; fetching at least a first and second timestamp correlated with said change of said at least first and second segment of software code respectively; determining a time difference between said change of said at least first and second segment of software code based on said at least first and second timestamp; if said time difference is within a predetermined range, assigning a temporal coupling between said at least first and second segment of software code; and if said temporal coupling has been assigned, identifying said first and/or second segment of software code as critical parts.

The software code may be comprised in at least two software code files.

The method may further comprise the step of providing a suggestion on how to re-arrange the software code such that the critical parts appear closer to each other.

The method may further comprise the step of re-arranging the software code according to the suggestion.

The method may further comprise the step of providing a suggestion on how to split one or several of the number of software code files and/or combine at least two software code files such that the critical parts appear closer to each other.

The method may further comprise the step of splitting and/or combining the one or several of the number of software code files according to the suggestion.

The method may further comprise the step of identifying a number of developers involved in the change of the at least first and second segment of software code, and wherein the step of assigning a ticket identifier coupling between the at least first and second segment of software code further comprises a prerequisite that the same developer has been involved in the change of the at least first and second segment of software code.

The method may further comprise the step of identifying a number of ticket identifiers referenced in the change of the at least first and second segment of software code, and wherein the step of assigning a temporal coupling between the at least first and second segment of software code further comprises the prerequisite that the change of the at least first and second segment of software code have been made with reference to the same ticket identifier.

According to a second aspect of the inventive concept, these and other objects are achieved in full, or at least in part, by a method for suggesting a developer suitable for updating software code comprised in a number of software code files, the method comprising: identifying a number of critical parts in the software code according the first aspect; identifying a number of developers that have been involved in developing the number of critical parts; and providing names of the number of developers.

According to a third aspect of the inventive concept, these and other objects are achieved in full, or at least in part, by a computer program comprising computer program code adapted to perform the steps according to the first aspect when the computer program is run on a computer.

The computer program may be embodied on a computer readable medium.

Other objectives, features and advantages of the present inventive concept will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present inventive concept, will be better understood through the following illustrative and non-limiting detailed description of different embodiments of the present inventive concept, with reference to the appended drawings, wherein.

DETAILED DESCRIPTION

The present inventive concept may enable the identification of potential risks in large codebases. Generally, the identification may be made possible by analysis of the historic contributions by developers involved in the development of a software code. More particularly, the identification may be made possible by analyzing the pattern of how individual functions evolve over time, within a single software code file and/or across multiple software code files.

It will be understood that the present inventive concept may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the present disclosure.

These computer program instructions may also be stored in a computer-readable medium that can direct a computer or other programmable data processing apparatus to function in a particular manner, such that the instructions stored in the computer-readable medium produce an article of manufacture including instructions means which implement the function specified in the present disclosure.

The computer program instructions may also be loaded onto a computer or other programmable data processing apparatus to cause a series of operational steps to be performed on the computer or other programmable data processing apparatus to produce a computer implemented process such that the instructions which execute on the computer or other programmable data processing apparatus provide processes for implementing the functions specified in the present disclosure.

In the context of the present inventive concept, the following terminology will be used:

Segment of software code—A function or method comprising software code.

Change of segment of software code—An addition of software code to the segment of software code, and/or a deletion of software code comprised in the segment of software code, and/or a re-arrangement of software code comprised in the segment of software code.

Temporal coupling—A coupling between at least two segments of software code based on analysis of software code changes with respect to time and/or developer involvement and/or ticket identifier references.

Below reference is made to a first and second segment of software code. However, as is readily appreciated by the person skilled in the art, any number of segments of software code is possible within the scope of the present inventive concept.

Figure 1:
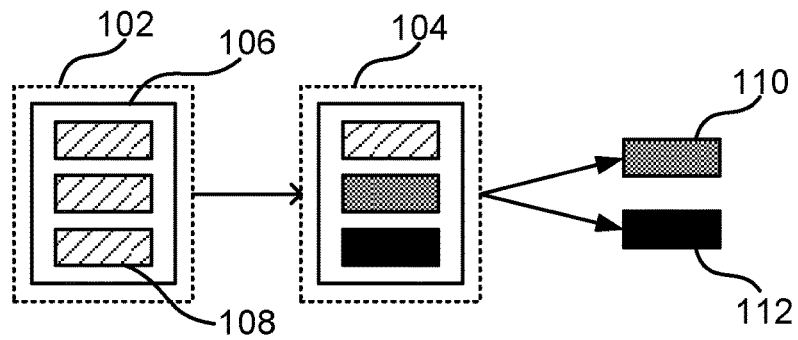
FIG. 1 schematically illustrates an example of two revisions of software code.

With reference to FIG. 1, a first revision 102 and a second revision 104 of a software code file 106 is illustrated. The first revision 102 may comprise a number of segments of software code 108. Here, between the two revisions 102, 104, a first and second segment of software code 110 and 112 respectively has been changed. The two changed segments of software code 110, 112, may be identified by comparing the second revision 104 to the first revision 102. It is to be understood that the two revisions 102, 104 are not necessarily subsequent revisions. In contrast, a number of revisions may have been performed between the two revisions 102, 104.

Figure 2:
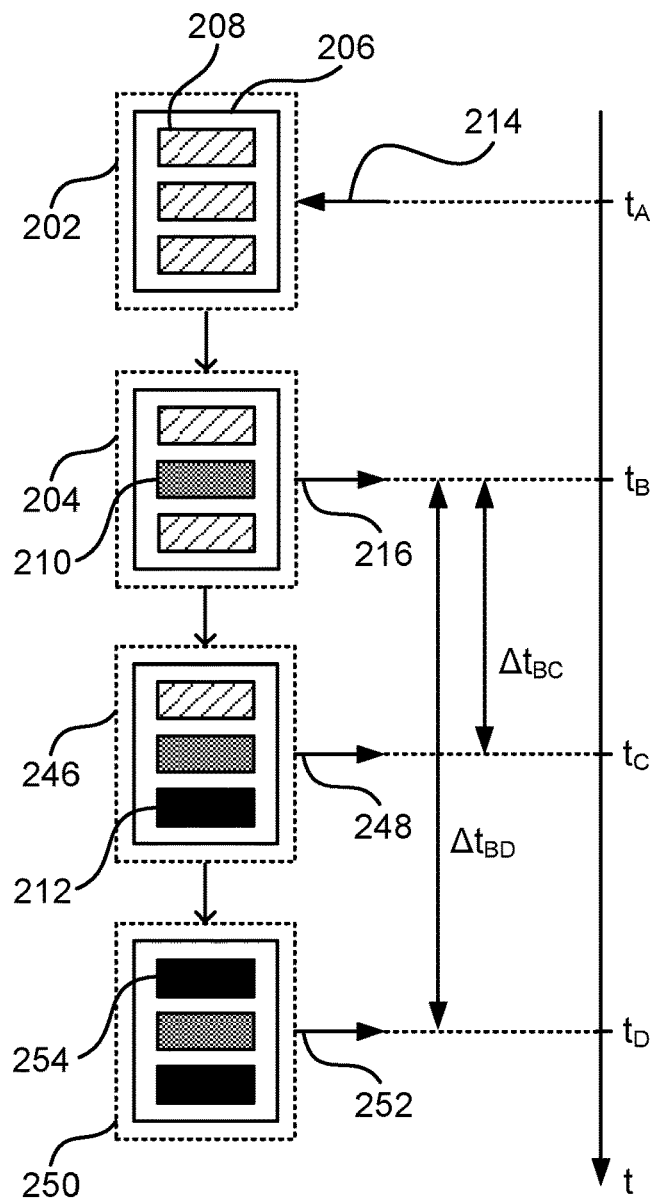
FIG. 2 schematically illustrates examples of information, events, and timestamps related to a development of a software code file.

Now referring to FIG. 2, examples of information, events, and timestamps related to a development of a software code file 206 are illustrated. Below, references will be made to changes of segments of software code files. It is to be understood that these changes may be identified according to the disclosure made in conjunction with FIG. 1.

The software code file 208 may comprise a number of segments of software code 208. The following may be seen as an example of how a software code file may change over time. A working copy of a first revision 202 may be checked out by a developer for revising the software code file 206. The checkout 214 may be associated with a timestamp $t_A$ correlated with the time at which the checkout 214 occurred. A change of a first segment of software code 210 may be made. The change of the first segment of software code 210 may be committed. A first commit 216 may be associated with a timestamp $t_B$ correlated with the time at which the first commit 216 occurred. In conjunction with the first commit 216, a second revision 204 may be created. The change of the first segment of software code 210 may be associated with the timestamp $t_B$. In other words, the timestamp $t_B$ may be correlated with the change of the first segment of software code 210.

A change of a second segment of software code 212 may be made. The change of the second segment of software code 212 may be committed. A second commit 218 may be associated with a timestamp $t_C$ correlated with the time at which the second commit 218 occurred. In conjunction with the second commit 248, a third revision 246 may be created. The change of the second segment of software code 212 may be associated with the timestamp $t_C$. In other words, the timestamp $t_C$ may be correlated with the change of the second segment of software code 212.

A time difference $\Delta t_{BC}$ between the changes of the first and second segment of software code 210, 212 may be determined based on the timestamps $t_B$, $t_C$, correlated with the changes of the first and second segment of software code 210, 212 respectively. If the time difference $\Delta t_{BC}$ is within a predetermined range, a temporal coupling between the first and second segment of software code 210, 212 may be assigned. The predetermined range may be defined in a unit of time, such as a number of minutes. One example of such a predetermined range is 0 hours to 24 hours. If the temporal coupling between the first and second segment of software code 210, 212 has been assigned, at least one of the first and second segment of software code 210, 212 may be identified as a critical part. The identification of at least one of the first and second segment of software code 210, 212 as critical parts may be further based on the frequency of assigned temporal couplings between the two segments of software code 210, 212. In other words, if a temporal coupling between the first and second segment of software code 210, 212 is assigned multiple times during a predetermined period of time, at least one of the first and second segment of software code 210, 212 may be identified as a critical part. The predetermined period of time may be defined in a unit of time, such as a number of minutes, hours, and days, or by the time between any two revisions of software code comprised in a number of software code files.

A change of a third segment of software code 254 may be made. The change of the third segment of software code 254 may be committed. A third commit 252 may be associated with a timestamp $t_D$ correlated with the time at which the third commit 252 occurred. In conjunction with the third commit 252, a fourth revision 250 may be created. The change of the third segment of software code 254 may be associated with the timestamp $t_D$. In other words, the timestamp $t_D$ may be correlated with the change of the third segment of software code 254.

A time difference $\Delta t_{BD}$ between the changes of the first and third segment of software code 210, 254 may be determined based on the timestamps $t_B$, $t_D$, correlated with the changes of the first and third segment of software code 210, 254 respectively. If the time difference $\Delta t_{BD}$ is within a predetermined range, a temporal coupling between the first and third segment of software code 210, 254 may be assigned. The predetermined range may be defined in a unit of time, such as a number of minutes. If the temporal coupling between the first and third segment of software code 210, 254 has been assigned, at least one of the first and third segment of software code 210, 254 may be identified as a critical part. The identification of at least one of the first and third segment of software code 210, 254 as critical parts may be further based on the frequency of assigned temporal couplings between the two segments of software code 210, 254. In other words, if a temporal coupling between the first and third segment of software code 210, 254 is assigned multiple times during a predetermined period of time, at least one of the first and third segment of software code 210, 254 may be identified as a critical part. The predetermined period of time may be defined in a unit of time, such as a number of minutes, hours, and days, or by the time between any two revisions of software code comprised in a number of software code files.

Figure 3:
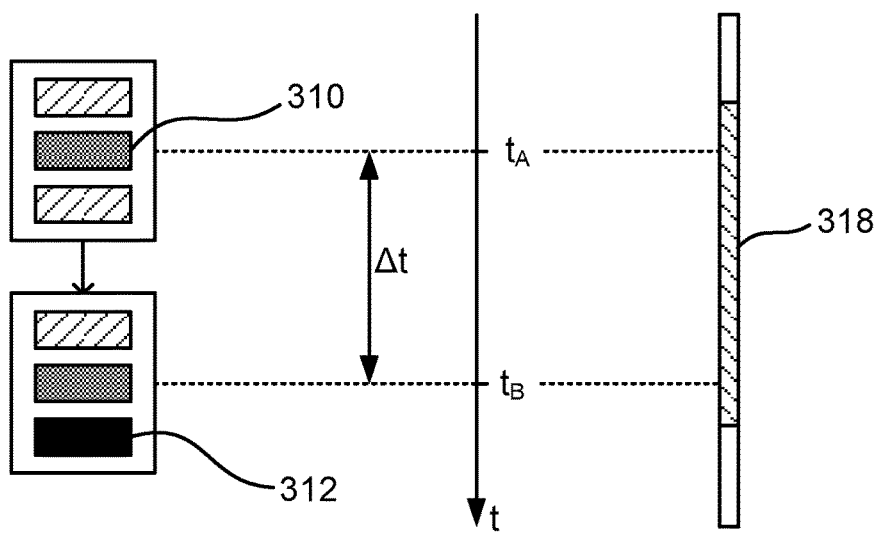
FIG. 3 schematically illustrates an example of ticket identifier referral in software code.

Now referring to FIG. 3, similar to the disclosure made in conjunction with FIG. 2, a change of a first segment of software code 310 may be associated with a timestamp $t_A$ correlated with the time at which the change occurred. A change of a second segment of software code 312 may be associated with a timestamp $t_B$ correlated with the time at which the change occurred. The two changes may be made while referencing the same ticket identifier 318. The fact that the two changes were made while referencing the same ticket identifier 318 may indicate that a temporal coupling between the first and second segment of software code 310, 312, exists. In other words, the assignment of a temporal coupling between the first and second segment of software code 310, 312, may be based solely on, or in combination with a time difference and predetermined range as described in conjunction with FIG. 2 or 8, the existence of a common ticket identifier 318 referenced for the changes of the first and second segment of software code 310, 312. In other words, a number of ticket identifiers referenced in the change of the first and second segment of software code 310, 312 may be identified. The assignment of a temporal coupling between the first and second segment of software code 310, 312 may comprise a prerequisite that the change of the first and second segment of software code 310, 312 has been made with reference to at least one and the same ticket identifier.

It may also be possible to identify a number of developers involved in the changes of the first and second segment of software code 310, 312. The assignment of a temporal coupling between the first and second segment of software code 310, 312 may be based solely on, or in combination with a time difference and predetermined range as described in conjunction with FIG. 2 or 8 and/or a ticket identifier as described in the section above, the existence of a common developer involved in the change of the first and second segment of software code 310, 312. In other words, a number of developers involved in the change of the first and second segment of software data 310, 312 may be identified. The assignment of a temporal coupling between the first and second segment of software code 310, 312 may comprise a prerequisite that at least one and the same developer has been involved in the change of the first and second segment of software code 310, 312. An identification of a common developer involved in the change of the first and second segment of software code 310, 312 may be defined as a developer coupling between the first and second segment of software code 310, 312. The predetermined range as described in conjunction with FIGS. 2 and 8 may be adjusted if a developer coupling between the first and second segment of software code 310, 312 is not assigned. Similarly, the predetermined range may be adjusted if a developer coupling between the first and second segment of software code 310, 312 is assigned. For example, if a developer coupling is assigned, the predetermined range may be increased.

Below, reference will be made to critical parts. It should be understood that there may exist subgroups of critical parts. In other words, depending on the temporal coupling, and/or developer coupling, a critical part may belong to a number of specific subgroups. In the disclosures made in conjunction with FIGS. 4-6, the critical parts 420, 520, and 620, belong to a common subgroup of critical parts respectively.

Figure 4:
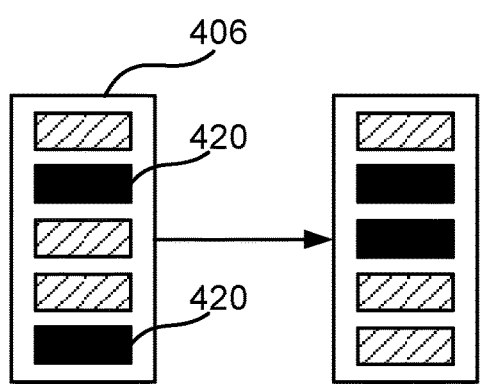
FIG. 4 schematically illustrates an example of a re-arrangement of software code.

Now referring to FIG. 4, a software code file 406 may comprise a number of critical parts 420 arranged among a number of segments of software code. The critical parts 420 may have been identified by any combination of the methods disclosed in conjunction with FIGS. 2, 3, and 8. The software code comprised in the software code file 406 may be re-arranged such that the critical parts 420 appear closer together in the software code. This may be accomplished by moving either of the critical parts 420. Hereby, the readability and comprehension of the software code file 406 may be increased.

Figure 5:
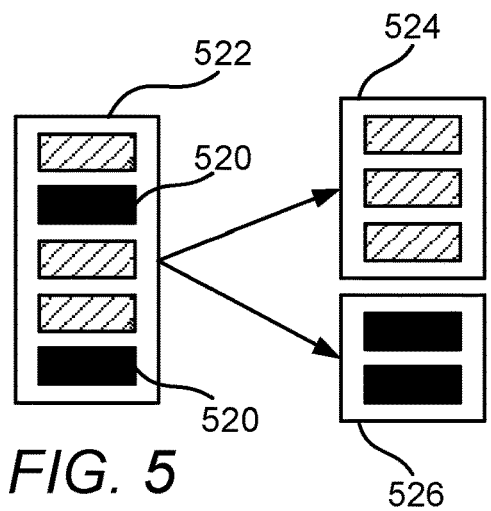
FIG. 5 schematically illustrates an example of a split of a software code file.

Now referring to FIG. 5, a first software code file 522 may comprise a number of critical parts 520 arranged among a number of segments of software code. The critical parts 520 may have been identified any combination of the methods disclosed in conjunction with FIGS. 2, 3, and 8. The software code file 522 may be split such that the critical parts 520 appear closer to each other in the software code. This may be accomplished by arranging the critical parts 520 in a second software code file 524 and arranging the remaining software code in a third software code file 526. As is readily understood by the person skilled in the art, any number of software code files may be created in order to provide for that critical parts comprised in the software code file 522 appear closer to each other.

Figure 6:
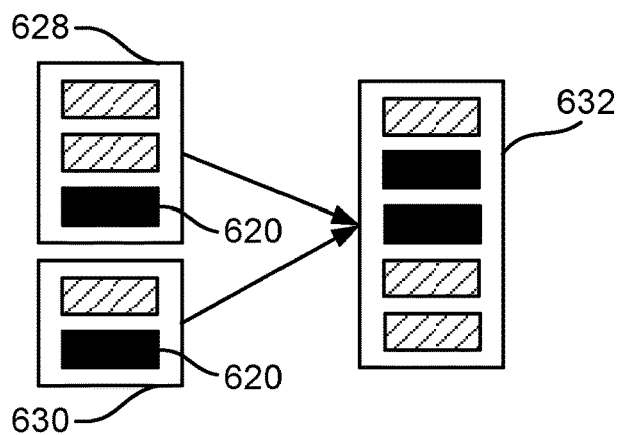
FIG. 6 schematically illustrates an example of a combination of software code files.

Now referring to FIG. 6, a first and second software code file 628, 630 may comprise a number of critical parts 620 arranged among a number of segments of software code.

Figure 8:
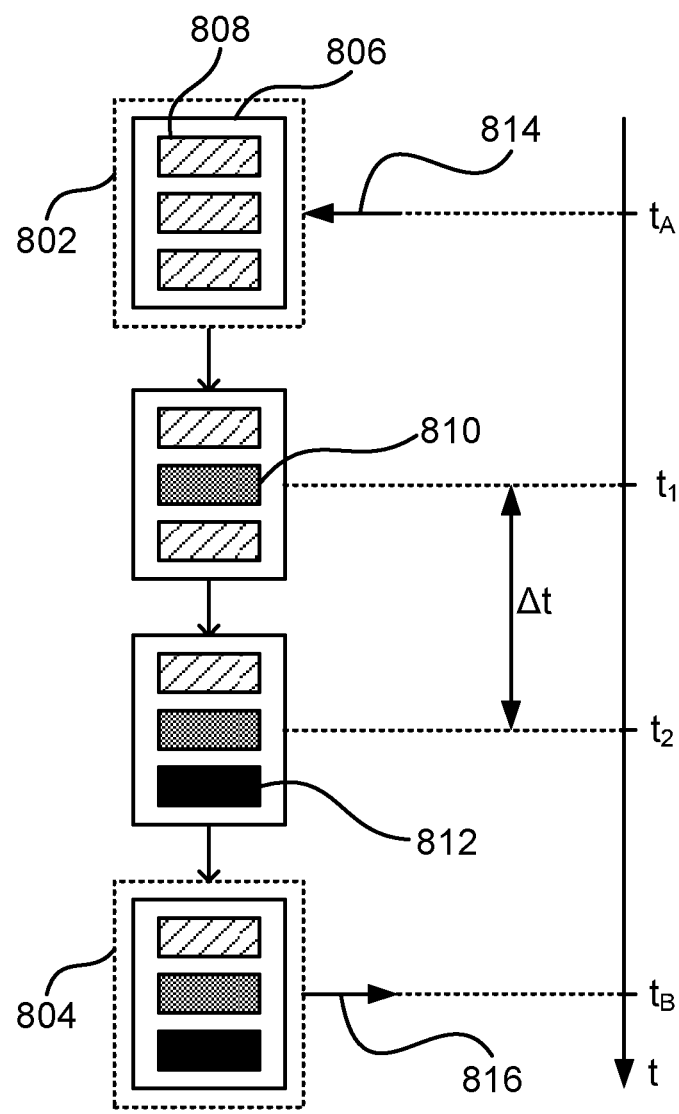
FIG. 8 schematically illustrates alternative examples of information, events, and timestamps related to a development of a software code file.

The critical parts 620 may have been identified by any combination of the methods disclosed in conjunction with FIGS. 2, 3, and 8. The first and second software code file 628, 630 may be combined such that the critical parts 620 appear closer to each other. This may be accomplished by arranging the software code comprised in both the first and second software code file 628, 630 in a third software code file 632. As is readily understood by the person skilled in the art, any number of software code files may be combined in order to provide for that critical parts comprised in the number of software code files appear closer to each other. Similarly, as is readily understood by the person skilled in the art, any number of software code files may be created as a result of the combination. For example, three software code files comprising critical parts belonging to a first and a second subgroup of critical parts may be combined to create a first and a second software code file comprising critical parts belonging to a first and a second subgroup of critical parts respectively.

Figure 7:
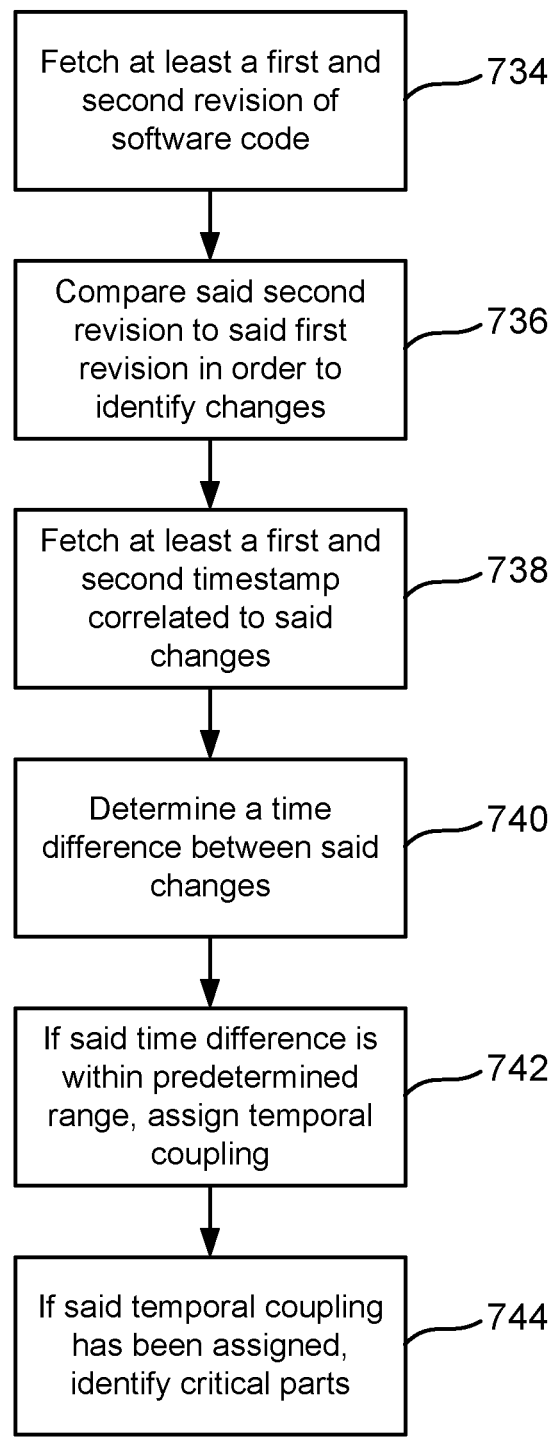
FIG. 7 is a block diagram of an example of a method for identifying critical parts.

Now referring to FIG. 7, a method for identifying critical parts in software code comprised in a number of software code files is illustrated in a block diagram. The method comprises a step of fetching 734 at least two revisions of the software code, wherein the at least two revisions comprises a first revision and a second revision, the second revision being a latter revision. The method further comprises comparing 736 the second revision to the first revision in order to identify at least a first and a second segment of software code in the second revision that have been changed. The method further comprises fetching 738 at least a first and second timestamp correlated with the change of the at least first and second segment of software code respectively. The method further comprises determining 740 a time difference between the change of the at least first and second segment of software code based on the at least first and second timestamp. The method further comprises, if the time difference is within a predetermined range, identifying 742 a temporal coupling between the at least first and second segment of software code. The method further comprises, if the temporal coupling has been assigned, identifying 744 the first and/or second segment of software code as critical parts.

Below will follow an alternative method of associating timestamps with changes of segments of software code. In contrast to the disclosure made in conjunction with FIG. 2, several timestamps may be associated with several changes of segments of software code between two subsequent revisions of a software code file.

Now referring to FIG. 8, alternative examples of information, events, and timestamps related to a development of a software code file 806 are illustrated. The software code file 806 may comprise a number of segments of software code 808. The following may be seen as an example of how a software code file may change over time. A working copy of a first revision 802 may be checked out by a developer for revising the software code file 806. The checkout 814 may be associated with a timestamp $t_A$ correlated with the time at which the checkout 814 occurred. A change of a first segment of software code 810 may be made. The change of the first segment of software code 810 may be associated with a timestamp $t_1$ correlated with the time at which the change occurred. A change of a second segment of software code 812 may be made. The change of the second segment of software code 812 may be associated with a timestamp $t_2$ correlated with the time at which the change occurred. At some point in time, the developer may commit his changes to the software code. The commit 816 may be associated with a timestamp $t_B$ correlated with the time at which the commit 816 occurred. After the commit 816 is made, a second revision 804 may be created. The changes may be identified according to the disclosure made in conjunction with FIG. 1. A time difference Δt between the changes of the first and second segment of software code 810, 812 may be determined based on the timestamps $t_1$, $t_2$, correlated with the changes of the first and second segment of software code 810, 812 respectively. If the time difference Δt is within a predetermined range, a temporal coupling between the first and second segment of software code 810, 812 may be assigned. The predetermined range may be defined in a unit of time, such as a number of minutes. If the temporal coupling between the first and second segment of software code 810, 812 has been assigned, at least one of the first and second segment of software code 810, 812 may be identified as a critical part. The identification of at least one of the first and second segment of software code 810, 812 as critical parts may be further based on the frequency of assigned temporal couplings between the two segments of software code 810, 812. In other words, if a temporal coupling between the first and second segment of software code 810, 812 is assigned multiple times during a predetermined period of time, at least one of the first and second segment of software code 810, 812 may be identified as a critical part. The predetermined period of time may be defined in a unit of time, such as a number of minutes, hours, and days, or by the time between any two revisions of software code comprised in a number of software code files.

The inventive concept may further enable a suggestion of a developer suitable for updating software code. The suggestion may be made by identifying a number of critical parts in the software code according to the disclosures made in conjunction with FIGS. 1-8. A number of developers that have been involved in developing the number of critical parts may be identified. The names of the number of developers may then be provided. Hereby, developers that are likely to be familiar with the critical parts of the software code may be suggested.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

Utilizing Ticket Identifiers to Identify Critical Parts

The following sections disclose a method for identifying critical parts in software code. In general, the method is based on the realization that if at least one and the same ticket identifier is referenced in the change of a first and second segment of software code, a ticket identifier coupling between the two segments of software code may be assigned, and at least one of the two segments of software code may be identified as a critical part. One example of such a method may be described as:

CLAUSES

1. A method for identifying critical parts in software code comprised in a number of software code files, said method comprising:
    fetching at least two revisions of said software code, wherein said at least two revisions comprises a first revision and a second revision, said second revision being a latter revision;

comparing said second revision to said first revision in order to identify at least a first and a second segment of software code in said second revision that have been changed;

fetching at least a first and a second ticket identifier associated with said change of said at least first and second segment of software code respectively;

determining if said first and second ticket identifier are the same; if said first and second ticket identifier are the same, assigning a ticket identifier coupling between said at least first and second segment of software code; and if said ticket identifier coupling has been assigned, identifying said first and/or second segment of software code as critical parts.

2. The method according to clause 1, wherein the software code is comprised in at least two software code files.

3. The method according to clause 1 or 2, further comprising the step of providing a suggestion on how to re-arrange the software code such that the critical parts appear closer to each other in said software code.

4. The method according to clause 3, further comprising the step of re-arranging said software code according to the suggestion.

5. The method according to any one of the preceding clauses, further comprising the step of providing a suggestion on how to split one or several of the number of software code files and/or combine at least two software code files such that the critical parts appear closer to each other.

6. The method according to clause 5, further comprising the step of splitting and/or combining said one or several of said number of software code files according to the suggestion.

7. The method according to any one of the preceding clauses, further comprising the step of identifying a number of developers involved in the change of the at least first and second segment of software code, and wherein the step of assigning a ticket identifier coupling between the at least first and second segment of software code further comprises the prerequisite that the same developer has been involved in the change of the at least first and second segment of software code.

8. The method according to any one of the preceding clauses, further comprising the steps of: fetching at least a first and second timestamp correlated with the change of the at least first and second segment of software code respectively; determining a time difference between the change of the at least first and second segment of software code based on the at least first and second timestamp; if the time difference is within a predetermined range, assigning a temporal coupling between the at least first and second segment of software code; and wherein the step of assigning a ticket identifier coupling between the at least first and second segment of software code further comprises a prerequisite that said temporal coupling has been assigned.

9. A method for suggesting a developer suitable for updating software code comprised in a number of software code files, the method comprising:
identifying a number of critical parts in the software code according to any one of clauses 1 to 8;
identifying a number of developers that have been involved in developing the number of critical parts; and
providing names of the number of developers.

10. A computer program comprising computer program code adapted to perform the steps of any one of clauses 1 to 8 when the computer program is run on a computer.

11. The computer program according to clause 10 embodied on a computer readable medium.

Identifying Parts in Software Code for Review

The following sections disclose a method for identifying parts in software code for review in order to improve the software code. This method may be performed as an automated step in a software code review process in order to get a list of parts of the software code that are critical for the functionality of the software code. In general, the method is based on the realization that a segment of software code subject to frequent changes may be more likely to contain errors compared to a segment of software code which is rarely changed. Further, a complexity analysis of the segments of software code may be combined with a change frequency analysis. For example, a complex segment of software code which is frequently changed is more likely to contain errors, compared to a less complex segment of software code which is frequently changed. One example of such a method may be described as:

CLAUSES

1. A method for identifying parts in software code for review, said method comprising:
providing a change frequency log comprising a number of segments of software code comprised in said software code;
determining a change frequency of said number of segments of software code;
updating said change frequency log to reflect said change frequency of said number of segments of software code;
assigning each of said number of segments of software code in said change frequency log a review score based on said change frequency; and
identifying segments of software code in said change frequency log having a review score exceeding a predetermined threshold as parts for review.

2. The method according to clause 1, wherein said software code is comprised in a plurality of software code files, and wherein said method further comprises a step of determining a change frequency of said number of plurality of software code files.

3. The method according to clause 1 or 2, further comprising determining a complexity value for each of said number of segments of software code, and wherein said review score is based on a combination of said complexity value and said change frequency.

4. The method according to any one of the preceding clauses, wherein the step of determining a change frequency of said number of segments of software code comprises
fetching a number of revisions of said software code;
identifying a number of segments of software code comprised in any of said number of revisions;
comparing pairs of subsequent revisions in said number of revisions in order to identify a number of segments of software code that have been changed; and
determining a number of change occurrences for each of said number of segments of software code that have been changed.

5. The method according to clause 2, further comprising identifying critical software code files based on a file change frequency and/or a file complexity value, and for said critical software code files, identifying parts for review according to any one of clauses 2 to 4.

As is evident from the clauses above, in one example of the method, a change frequency may first be determined on a file-level, and subsequently on a sub-file level. In other words, a plurality of software code files may first be analyzed in order to find the software code file which is most frequently changed. The software code file which is most frequently changed may then be analyzed in order to determine the change frequency of individual segments of software code comprised in the software code file. The method may further comprise analyzing and identifying a file complexity value for each software code file. Hereby, an efficient method for identifying software code parts for review is achieved.

LIST OF REFERENCE SIGNS

102 First revision
104 Second revision
106 Software code file
108 Segment of software code
110 First segment of software code
112 Second segment of software code
202 First revision
204 Second revision
206 Software code file
208 Segment of software code
210 First segment of software code
212 Second segment of software code
214 Checkout
216 First commit
246 Third revision
248 Second commit
250 Fourth revision
252 Third commit
254 Third segment of software code
310 First segment of software code
312 Second segment of software code
318 Ticket identifier
406 Software code file
420 Critical part
520 Critical part
522 First software code file
525 Second software code file
526 Third software code file
620 Critical part
628 First software code file
630 Second software code file
632 Third software code file
734 Step of fetching revisions
736 Step of comparing revisions
738 Step of fetching timestamps
740 Step of determining time difference
742 Step of identifying temporal coupling
744 Step of identifying critical part
802 First revision
804 Second revision
806 Software code file
808 Segment of software code
810 First segment of software code
812 Second segment of software code
816 Commit

The invention claimed is:

1. A method for identifying critical parts in software code comprised in a number of software code files, said method comprising:

fetching at least two revisions of said software code, wherein said at least two revisions comprises a first revision and a second revision, said second revision being a latter revision;

comparing said second revision to said first revision in order to identify at least a first and a second segment of software code in said second revision that have been changed;

fetching at least a first and second timestamp correlated with said change of said at least first and second segment of software code respectively;

determining a time difference between said change of said at least first and second segment of software code based on said at least first and second timestamp;

if said time difference is within a predetermined range, assigning a temporal coupling between said at least first and second segment of software code;

if said temporal coupling has been assigned, identifying said first and/or second segment of software code as critical parts;

suggesting how to re-arrange said software code such that said critical parts appear closer to each other; and re-arranging said software code according to said suggestion, wherein the re-arranging comprises one or more of:

moving one of the critical parts closer to another one of the critical parts, combining a first software code file comprising one of the critical parts with a second software code file comprising another one of the critical part, or splitting a software code file comprising the critical parts and arranging the critical parts in one of the split software code files.

2. The method according to claim 1, wherein the software code is comprised in at least two software code files.

3. The method according to claim 1, further comprising the step of providing a suggestion on how to split one or several of said number of software code files and/or combine at least two software code files such that said critical parts appear closer to each other.

4. The method according to claim 3, further comprising the step of splitting and/or combining said one or several of said number of software code files according to said suggestion.

5. The method according to claim 1, further comprising the step of identifying a number of developers involved in said change of said at least first and second segment of software code, and wherein the step of assigning a temporal coupling between said at least first and second segment of software code further comprises a prerequisite that the same developer has been involved in said change of said at least first and second segment of software code.

6. The method according to claim 1, further comprising the step of identifying a number of ticket identifiers referenced in said change of said at least first and second segment of software code, and wherein the step of assigning a temporal coupling between said at least first and second segment of software code further comprises the prerequisite that said change of said at least first and second segment of software code have been made with reference to the same ticket identifier.

7. The method according to claim 1, further comprising:

identifying a number of developers that have been involved in developing said number of critical parts; and providing names of said number of developers.

8. A computer having a processor executing computer program code to perform the steps of claim 1.

9. The computer according to claim 8, wherein the computer program code is embodied on a non-transitory, computer readable medium.

10. A computer program product comprising a non-transitory computer readable medium, having thereon computer program code loadable into a data processing unit and configured to cause execution of the method according to claim 1 when run by the data processing unit.

* * * * *